Nov. 14, 1944.  F. J. WATSON  2,362,682
APPARATUS FOR CHECKING THE POWER GENERATED BY SMALL MOTORS
Filed June 17, 1943  2 Sheets-Sheet 1
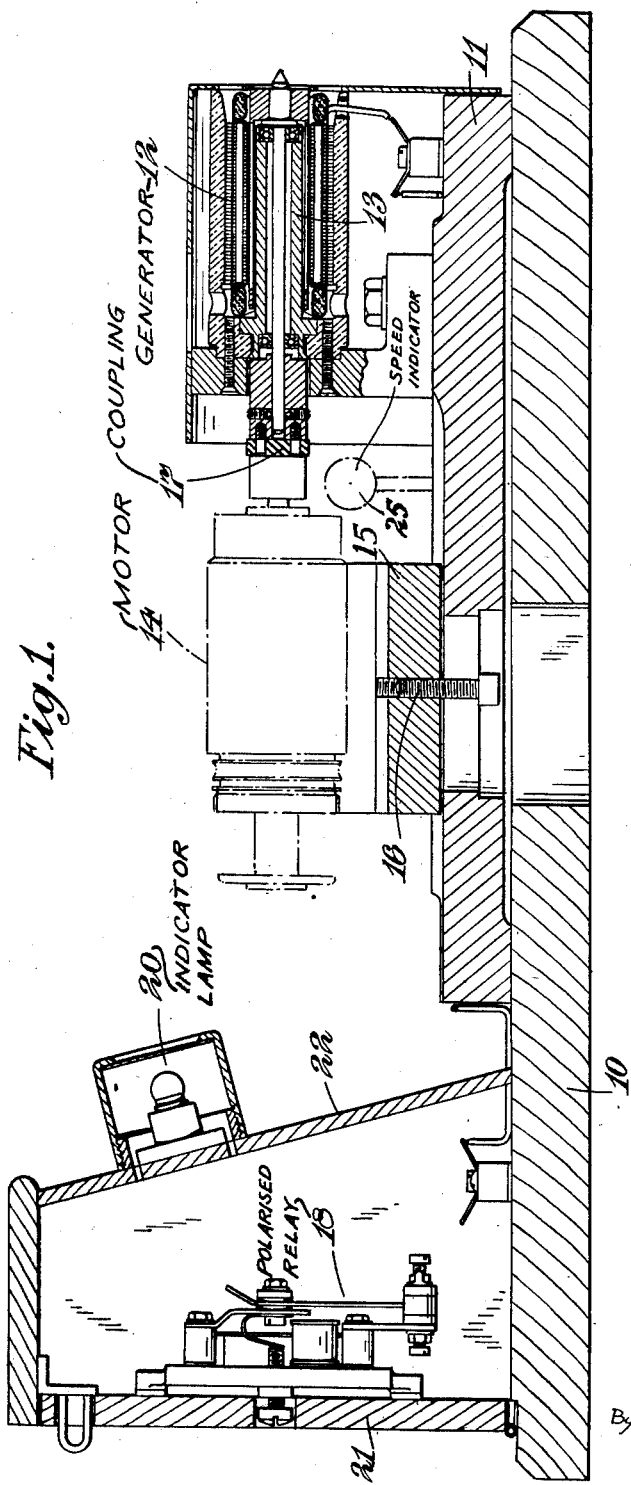

Nov. 14, 1944.　　　F. J. WATSON　　　2,362,682
APPARATUS FOR CHECKING THE POWER GENERATED BY SMALL MOTORS
Filed June 17, 1943　　　2 Sheets-Sheet 2
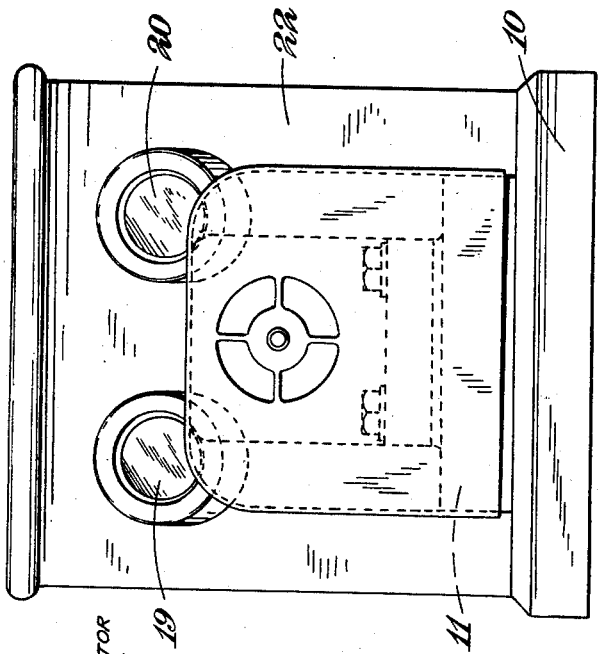
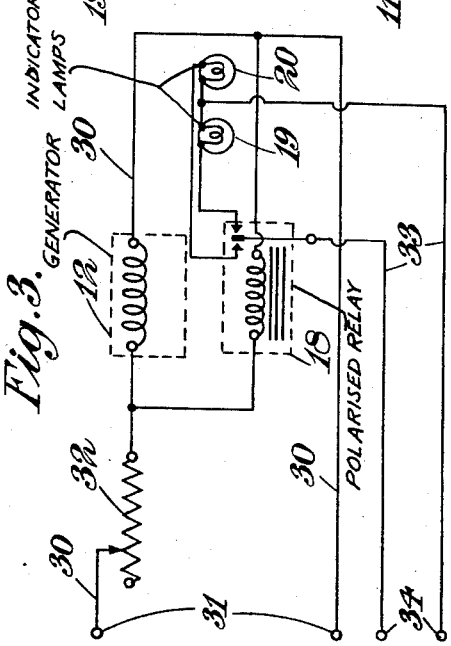

Patented Nov. 14, 1944

2,362,682

UNITED STATES PATENT OFFICE 2,362,682

APPARATUS FOR CHECKING THE POWER GENERATED BY SMALL MOTORS

Frederick James Watson, Old Windsor, England, assignor to Self-Priming Pump & Engineering Co. Limited, London, England, a British company Application June 17, 1943, Serial No. 491,187
In Great Britain April 23, 1942

1 Claim. (Cl. 73—116)

This invention consists of improvements in or relating to apparatus for checking the power generated by small electric motors and the object is to provide a rapid check on the performance of small motors and in particular to ascertain whether or not the power generated by the small motor reaches the prescribed standard when the motor is run at its prescribed speed.

As is well known a complete and accurate test of the performance of an electric motor by the methods prescribed under the British Standards Institution involves the observation and recording of the various factors over a considerable period of time such as six hours, but for small motors made under a system of mass production such a complete test is both impracticable and unnecessary and it is sufficient for practical purposes to ascertain that at the speed at which the motor is to be run, the power generated reaches the standard prescribed.

This invention provides a device for checking the power performance of a motor comprising the combination of an eddy current generator the field of which is variable and controlled by means of a variable resistance, a mounting device for the motor to be tested, mechanical coupling means for connecting the motor to the eddy current generator, means for ascertaining when the motor is running at a predetermined speed, a polarised relay coupled in parallel with the field of the eddy current generator, and two visual indicators (such as a red lamp and a green lamp) controlled by the polarised relay to indicate whether or not the power generated by the motor has reached the prescribed standard.

Preferably a stroboscope is employed for ascertaining that the motor is running at the prescribed speed.

In practice it is intended that the device shall be fool-proof so that it can be operated by unskilled labour and in a preferred form the device forms a unitary structure which may be portable and the various parts can be mounted on a rigid base.

One arrangement according to the invention will now be described by way of example with reference to the accompanying drawings, in which—

Figure 1 is a side elevation, partly in section, of the apparatus;

Figure 2 is an end view looking in the direction of the indicator lamps, and

Figure 3 is a wiring diagram.

Like reference numerals indicate like parts in all the figures of the drawings.

In this example the apparatus comprises a rigid base 10 supporting a plate 11, on one end of which is mounted an eddy current generator 12, adapted to be driven by the motor to be tested. The generator 12 is of known form having a solid copper armature 13 (or, alternatively, a rotor of squirrel cage type) and the field circuit 30 is coupled to a suitable source of alternating current supply 31 which is controlled by a rheostat 32 and a hand-operated switch (not shown). The motor to be tested, indicated in dot-and-dash lines at 14 in Figure 1, is supported, with its shaft in alignment with the armature shaft of the generator, by means of a V-block or other suitable support 15 mounted on the plate 11. The block 15 is adjustable along the plate 11 to accommodate the support for motors of different sizes, the plate being locked in its position of adjustment by a set-screw 16. Driving connection between the shaft of the motor 14 and the armature 13 is effected by a flexible coupling 17 of such form that the mechanical connection can readily be made by pushing the motor along the V-block towards the generator. The motor 14 is supplied with current through a circuit (not shown) which may be controlled by a hand-operated switch.

In parallel with the field of the generator 12 is connected a polarised relay 18 which controls the circuit 33 of indicator lights 19, 20 which are of two different colours, say red and green. The lamp circuit is supplied from a suitable source 34. The relay 18 is mounted on a vertical panel 21 upstanding from the end of the rigid base 10 remote from the generator, and the indicator lamps are mounted on a sloping panel 22 immediately in front of the relay. For the purpose of ascertaining that the motor 14 is running at the correct speed a stroboscope, indicated diagrammatically at 25 in Figure 1, is so arranged as to give clear observation of the rotor of the motor, preferably in the region of the coupling 17. The stroboscope may be of standard type or of the kind described in the specification of British Patent application No. 5481/42.

An eddy current generator is selected for the purposes of this test because the characteristics of such generator are those within the particular speed range of the type of motor to be tested.

The method of operating the apparatus is as follows.

The motor 14 to be tested is placed on the V-block or equivalent support 15 and connected to the generator 12 by means of the coupling 17. The motor is then started and load is applied by means of the variable field of the generator and while this is being done the speed of the motor is observed by the stroboscope. When the speed of the motor is reduced to a predetermined figure, by virtue of the load applied by the eddy current generator, the current in the field of the latter is then a function of the power of the motor under test. If the generator field current is below a predetermined amount when the prescribed speed of the motor under load has been reached, then the red light is operated by the relay 18, indicating that the performance of the motor is below the necessary standard. Should the intensity of the current in the field of the generator be equal to or higher than the predetermined figure, then the relay 18 brings the green light into operation, showing that the motor's performance is equal to or above that of the standard required.

Instead of the particular location of the polarized relay and visual indications shown in the illustrated example, any other arrangement of these components which makes for compactness and ease of manufacture may be adopted.

It will be understood that the apparatus according to the invention can be used for the rapid testing of a series of motors of any selected rating and can be operated by semi-skilled labour with safety and accuracy. Although the invention is principally concerned with the testing of small electric motors, it will be appreciated that the apparatus would also be applicable to the testing of small motor-car engines and in general to any small prime-movers, particularly of the mass production type.

I claim:

A device for checking the power performance of a motor comprising the combination of an eddy current generator the field of which is variable and controlled by means of a variable resistance, a mounting device for the motor to be tested, mechanical coupling means for connecting the motor to the eddy current generator, means for ascertaining when the motor is running at a predetermined speed, a polarised relay coupled in parallel with the field of the eddy current generator, and two different visual indicators controlled by the polarised relay to indicate whether or not the power generated by the motor has reached the prescribed standard.

FREDERICK JAMES WATSON.